(12) United States Patent
McNamee (10) Patent No.: US 6,964,447 B2
(45) Date of Patent: Nov. 15, 2005

(54) VEHICLE COVER SYSTEM (76) Inventor: Thomas C. McNamee, 2451 Monaco Dr., Channel Islands Harbor, CA (US) 93035

(*) Notice: Subject to any disclaimer, the term of this patent is extended or adjusted under 35 U.S.C. 154(b) by 0 days.

(21) Appl. No.: 10/750,744

(22) Filed: Dec. 31, 2003

(65) Prior Publication Data
US 2005/0218692 A1 Oct. 6, 2005

(51) Int. Cl.7 .............................................. B60J 11/00
(52) U.S. Cl. ................... 296/136.07; 150/166
(58) Field of Search ................ 296/107.17, 107.08, 296/107.11, 108, 136; 150/166; 135/88.01; 280/770

(56) References Cited

U.S. PATENT DOCUMENTS

| | | | |
|---|---|---|---|
| 4,013,018 A * | 3/1977 | Hansen et al. | ......... 296/100.01 |
| 4,041,999 A | 8/1977 | Miller | |
| 4,179,152 A | 12/1979 | Kent, Jr. | |
| 4,289,346 A | 9/1981 | Bourgeois | |
| 4,589,459 A | 5/1986 | Lantrip | |
| 4,671,203 A | 6/1987 | Sanburg | |
| 4,952,007 A | 8/1990 | Shahrokh | |
| 4,968,085 A | 11/1990 | Stann | |
| 5,388,702 A | 2/1995 | Jones | |
| 5,605,369 A | 2/1997 | Ruiz | |
| 5,673,961 A * | 10/1997 | Mazzarelli | ............. 296/136.07 |
| 5,738,403 A | 4/1998 | Tyson | |
| 5,788,317 A | 8/1998 | Nation | |
| 5,820,196 A | 10/1998 | Rudys et al. | |
| 5,845,958 A | 12/1998 | Rudys et al. | |
| 5,915,399 A | 6/1999 | Yang | |
| 6,010,176 A | 1/2000 | Jones | |
| 6,099,067 A | 8/2000 | Butterworth | |
| 6,209,599 B1 * | 4/2001 | Richardson | ................ 150/167 |
| 6,220,648 B1 | 4/2001 | Daniel | |
| 6,273,493 B1 | 8/2001 | Woo | |
| 6,302,469 B1 | 10/2001 | Jones | |
| 6,340,198 B1 | 1/2002 | Benites et al. | |
| 6,491,335 B1 | 12/2002 | Cohill | |
| 6,588,827 B2 | 7/2003 | Heiland | |
| 6,655,726 B2 | 12/2003 | Bergeron | |
| 2002/0069947 A1 * | 6/2002 | Frechette et al. | ........... 150/166 |

* cited by examiner

Primary Examiner—Lori L. Coletta
(74) Attorney, Agent, or Firm—Marvin E. Jacobs (57) ABSTRACT A vehicle cover system comprising: removably attachable mating cover portions adapted to cover a vehicle, the vehicle having a top, a bottom, opposing sides; a front end, and a rear end; each the removably attachable mating cover portion removably attached to and mating with at least one adjacent one of the removably attachable mating cover portions; the removably attachable mating cover portions comprising: at least one substantially U shaped cover portion adapted to cover a portion of the top and an adjacent portion of each of the opposing sides of the vehicle; front and rear end portions adapted to cover the front end and the rear end of the vehicle, respectively; the at least one substantially U shaped cover portion having a length selected from the group consisting of a first length, a second length, and a third length.

44 Claims, 7 Drawing Sheets

VEHICLE COVER SYSTEM

BACKGROUND OF THE INVENTION

1. Field of the Invention

The present invention relates generally to vehicle covers and more particularly to vehicle protective covers.

2. Background Art

Covers are typically used to protect vehicles from the weather and conditions such as storms, rain, snow, hail, sun, wind, wind carrying detritus, sand storms, hurricanes, atmospheric borne environmental hazards, and the like, and to protect the vehicles during storage. The covers are used to protect the vehicles and the vehicles' finishes from the elements and to keep the vehicles clean for their next use.

Covers of soft flexible material have been used to protect automobiles, recreational vehicles, campers, trailers, trucks, vans, boats, airplanes, and the like, and are typically manufactured in many different sizes and shapes to accommodate the large variety of sizes and shapes required to fit the many different types of vehicles, and sizes and shapes of those vehicles to be covered. As a result, a manufacturing and inventory burden has been placed on the manufacturers of such covers, and as new vehicle models come out each year, an ever increasing load is being placed on these manufacturers to manufacture and inventory an ever increasing variety of sizes, shapes, and types of covers, resulting in increasing costs being passed on to consumers.

Although there have been some attempts made to decrease the number of covers required for the large variety of sizes and shapes of vehicles, none of these attempts have been satisfactory in decreasing the manufacturing and inventory burden on suppliers, including skilled labor requirements to manufacture the large variety of covers, large and expensive inventories, and the resulting increase in costs, which have been passed on to consumers.

Attempts to resolve these issues for recreational vehicles have been to manufacture many differently sized covers to fit the many different sized vehicles in use. Attempts at "semi universal" covers have resulted in covers that fit some vehicles, but do not fit all vehicles well and/or do not fit certain vehicles at all. Even with this "semi universal" approach, the sellers of covers are still required to manufacture and inventory a large number of covers to address their customers' needs.

A typical recreational vehicle, for example, may range from eighteen feet long to as long as thirty six feet. Such covers are typically manufactured in lengths from eighteen feet to thirty six feet in two foot increments, thus requiring ten different size covers to cover the eighteen to thirty six foot vehicle length range. The most popular vehicles may, however, be addressed with eight different sizes. Current applications, however, require as many as 43 different sizes covers to fit the different types and sizes of vehicles.

A vehicle cover system is needed, which minimizes the number of covers required to be manufactured and inventoried, and which fits substantially all the recreational vehicles currently in use and projected to be in use for the foreseeable future. The vehicle cover system should have a minimum number of different component parts for simplicity of manufacturing, and to minimize cost and inventory requirements. The vehicle cover system should be long lasting, durable, easy and simple to install, and manufacture.

Vehicles, such as recreational vehicles, are often stored for extended periods of time, and are typically used only 30 days in a 12 month period, with the vehicle stored or parked for 300 days or more during the year, which present additional challenges. Each of the covers must fit reasonably close and conform to the shape and size of the vehicle being covered, and, be held onto the vehicle to keep the cover from moving during windy conditions, which force the cover to beat against and damage the vehicle's surface, or be blown off and lost, as the vehicle is left sitting and unattended. An ill fitting cover that moves, when it is not supposed to acts as an abrasive, and may damage not only the vehicle's finish, but accelerate wear of the cover.

Attempts to decrease buffeting of the covers against the vehicles have been to fasten straps to the bottoms of the covers on opposing sides of the covers adjacent opposing sides of the vehicles, and fasten ropes to the straps on the opposing sides of the covers, the ropes extending under the vehicles to the straps on the opposing sides of the vehicles. While this may keep the covers from being blown off the vehicles completely, the covers still move during windy conditions, fill with wind and billow, or parachute, and move excessively, which results in accelerated and excessive wear to the vehicles' surfaces and the covers, and abrasion of, and damage to the vehicles.

The vehicle cover system should minimize abrasion and damage to a vehicle that the vehicle cover system is installed on, and minimize wear to the vehicle cover system.

A user should be able to easily enter and exit his or her vehicle, when the vehicle is covered, the user being able to fully or partially pull back or remove a portion of the cover, and be able to open a door of the vehicle for entry and exit.

Manufacturers have incorporated zippered or hook and loop fastened doors into the covers for vehicle entry and exit. However, door placement varies greatly from one model to the other of the same vehicle manufacturer, with the variation between manufacturers resulting in an extremely large variation of door locations. To locate and incorporate the door into the cover at the proper location for a particular vehicle has required a "custom made" cover with specified, custom entry door placement. Some cover manufacturers place two very large zippered access panels on a side of the cover to allow a" universal" entry panel; which while allowing door placement for multiple vehicles, it presents the problem of a very large and unwieldy piece of material to unzip and secure, by one or two persons on a ladder.

The vehicle cover system should facilitate easy entry and exit to the vehicle.

There is thus a need for a vehicle cover system, which minimizes the number of covers required to be manufactured and inventoried, and which fits substantially all the recreational vehicles currently in use and projected to be in use for the foreseeable future. The vehicle cover system should have a minimum number of different component parts for simplicity of manufacturing, and to minimize cost and inventory requirements. The vehicle cover system should minimize abrasion and damage to a vehicle that the vehicle cover system is installed on, and minimize wear to the vehicle cover system. The vehicle cover system should be long lasting, durable, easy and simple to install, and manufacture. The vehicle cover system should be long lasting, durable, easy and simple to install and manufacture, and facilitate easy entry to and exit from the vehicle.

Different vehicle covers have heretofore been known. However, none of the vehicle covers adequately satisfies these aforementioned needs.

U.S. Pat. No. 4,041,999 (Miller) discloses a vehicle protector, which utilizes a plurality of plastic sheets each having one surface thereof covered with a soft resilient material. The soft sides of the sheets are disposed covering the outermost surface of the front fenders, the front door panels and the remaining side panels of a motor vehicle. The sheets are cut so as to have their marginal edges substantially conform to the marginal edges of the portions of the vehicle which they are adapted to cover. A pair of elastic bands straddles the front grille portion of the vehicle and is secured to the leading marginal edges of the pair of sheets covering the front fenders. Another pair of elastic members joins the pair of sheets covering the front fenders residing on the hood of the vehicle. Snap fasteners secure the trailing edge of the front fender cover sheets to the body of the vehicle adjacent the leading edge of the front doors. Another pair of sheets covers the front doors and is adapted with openings accommodating door handles and side view mirrors. The cover sheets for the doors utilize snap fasteners to secure to the leading edge of the front doors and hook-like plastic members to secure the remaining marginal edges of the door cover sheets by capturing portions of the marginal edges of the front doors. A third pair of sheets cover the remaining side panels of the vehicle utilizing plastic hook-like members to capture portions of the marginal edges of the remaining side panels and a third pair of elastic bands, joining to each of the third pair of cover sheets straddling the rear portion of the vehicle.

U.S. Pat. No. 4,589,459 (Lantrip) discloses a vehicle protective cover, which includes a front portion having a front panel, attached hood panel and front side panels. The hood panel and front side panels are adapted to allow them to be detachably connected along the outside edge of the hood panel, thereby providing essentially continuous coverage of the hood and lower front side walls of the vehicle. The front side panels extend backwardly beyond the rear edge of the vehicle doors to overlap with a rear portion of the cover. The rear portion of the protective cover includes rear side panels, which extend down the rear exterior side walls of the vehicle. The rear side panels are preferably connected together at the rear, and are provided with adjustment, so that the rear side panels can be drawn taut against the vehicle. Intermediate portions can also be included where the vehicle being protected includes four doors. Fasteners can be advantageously used at points about the wheel wells and lower edges of the side panels to help secure the protective cover on the vehicle.

U.S. Pat. No. 6,491,335 (Cohill) discloses an automobile body cover for positioning over an automobile body. The automobile body cover has a plurality of individual covers that together completely cover the automobile body. The body cover includes a front cover, a rear cover, a front middle cover, and a rear middle cover. Each cover fits over the corresponding part of the automobile. Each cover has an inner layer and an outer layer, an open bottom end, and a bottom edge. The layers are bound together at the bottom edge. When in place over the automobile, the inner layer rests against the automobile body. A plurality of C-shaped hooks extend downward from the bottom edges of the covers. These hooks secure the covers in place under the automobile. A plurality of magnets are positioned along the cover bottom edges, between the inner layer and the outer layer.

U.S. Pat. No. 5,915,399 (Yang) discloses a multipurpose cover for a car, including a roof sunshade for covering the roof of the car, four screen-like knitting fabrics for separately covering the windshield, the rear window, and side windows of the car, four side sunshades for covering a front, a rear, and two side parts of the car, and four roll-up sunshades for covering the four screen-like knitting fabrics. The sunshades or fabrics are sewed together to form a complete cover for car. The roll-up sunshades are provided at their two lateral sides with zippers and at lower edges with hooks connected to the roll-up sunshades by means of elastic bands. Two of the screen-like knitting fabrics covering two sides of the car and their corresponding side sunshades have a vertical split at their middle portion. Zippers are sewed to these splits to facilitate opening of doors via the splits. The cover for the car serves to block sunlight and snow, and keep out mosquitoes and flies.

U.S. Pat. Nos. 6,302,469 and 6,010,176 (Jones) disclose a reversible soft cover for trucks, trailers, and other vehicles. The cover contains a central upper portion, and front, rear, and side portions extending from the central portion to completely enclose a bed or cargo area. Each of the front, rear, and side portions may be individually opened, and the rear section may be rolled-up from either inside or outside the vehicle using a lanyard. Flap covers prevent the hemmed side edges of the front, rear, and side portions from exposure, regardless of which surface is exposed, and provide a substantially weatherproof seal between panels.

U.S. Pat. No. 4,671,203 (Sanburg) discloses a boat supported duck blind, for mounting on the gunwales of a boat hull, which includes separate bow, stern and central frame sections adapted for use on various size boats. Camouflage designed cover sections with windows are provided for each frame section, and are removably connected by zippers to provide a cover over the entire boat. Desired access points or shooting stations from the boat to the outside are obtained by the strategically arrangement of zippered fasteners. A reticulated camouflage type curtain is arranged inside the cover sections to provide concealment for the hunter when designated cover sections are unzippered. A separate zippered section in the central cover provides ingress and egress for the hunter's dog, and the reticulated curtain can be arranged by appropriate zippering to provide an enclosure about the dog's station within the boat, to protect the hunter from water spray when the dog returns to the boat from the water and shakes itself off. The frame sections are of a knockdown construction for ease of handling and storage, and are adjustable to provide a fully erected cover, an open bow or stern section of the boat, separately or simultaneously, a tarp-type closure for the bow or stern section of the boat, separately or simultaneously, a full open boat with the cover sections folded down and a tarp-like enclosure for the entire boat for storage or trailering. The boat can be trailered with the cover fully erected for which an auxiliary bow cover support is provided.

U.S. Pat. No. 4,952,007 (Shahrokh) discloses a transportation vehicle cover and refastenable exterior connecting system, which includes a cover for covering a vehicle used to transport people and a releasable connecting system, which releasably connects the cover to the vehicle at the outside of the vehicle. The cover is a flexible sheet that is sized and shaped to cover exterior surfaces of the passenger compartment of the vehicle. Opaque and reflective qualities of the cover prevent the compartment from getting uncomfortably hot or damaged from exposure to summer sun, and use of the cover during winter shields the vehicle's windows from ice and snow. The cover and connecting system also serve to deter and resist entry of unauthorized persons into the vehicle.

U.S. Pat. No. 4,968,085 (Stann) discloses a truck bed cover for covering and protecting loads of varying height. The cover includes a generally rectangular center section of a size adapted to cover the truck bed, surrounded by four outwardly-extending panels or flaps. Each of the flaps is provided with a series of connectors designed to mate with compatible elements located on the truck bed sides. The connectors are arranged on the panels such that the panels may be folded to provide various effective heights for the cover, the folded portions of the panels being maintained in position by complementary fasteners located on the cover.

U.S. Pat. No. 6,655,726 (Bergeron) discloses a retractable tarpaulin that can cover the cargo of truck, either partially or entirely. This system comprises a pair of posts that slide in notches at the periphery of a trailer flat bed, at the desired position according to the size of the cargo to cover. The width is also adjustable and includes an overhang of up to 12" on either side. The length may be reduced or extended at both front end and aft end if needed. The height of these posts can be adjusted to adapt to the cargo. A series of cables covers the distance from one post to the other to support the tarpaulin, and a drum arrangement stretches the cables to provide tightness to support the tarpaulin. As the tarp is retracted, a number of rings attached to the tarp are successively engaged in a cantilever hanger to keep the tarp in a small storage, when not in use.

U.S. Pat. No. 5,605,369 (Ruiz) discloses a protective cover for a vehicle, which includes a main section, a door section, and a secondary section. The vehicle may be operated when the protective cover is installed upon the vehicle. The protective cover includes window screen elements that cover the vehicle windows and light fixture screen elements that cover the vehicle headlights and taillights. The protective cover also includes a flap section that covers the door seam formed around the door and a second flap section that covers the seam formed between different body sections of the vehicle. The door section is secured to the vehicle door with a drawstring that is tightened around the perimeter of the door, and includes a door handle access panel and a side view mirror opening.

U.S. Pat. No. 5,788,317 (Nation) discloses a dual paneled golf cart enclosure for all weather having a plurality of pairs of inner panels and outer panels, which may be a combination of either mesh and plastic vinyl or plastic vinyl and plastic vinyl panels, some of the plastic panels being transparent. The panels are attached to and suspended from an enclosure top panel over a roof of a golf cart. The pairs of panels may cover both sides of the golf cart as well as the front and back of the golf cart as desired and necessary. Depending on weather and use conditions, either or both pairs of panels may be secured in a rolled-up position around a perimeter of the golf cart roof by means of panel-holding straps wrapped around the rolled-up panels and attached to the panel-holding straps between each pair of panels using snaps or other fasteners. A roll cover to protect the rolled-up panels from sun and other elements may be provided by an extension of the top panel or a separate valance. A plurality of combinations of hook straps and/or buckles secure the enclosure and panels to the golf cart. Using a pair of inside screened or mesh panels inside outer plastic panels allows the plastic panels to be rolled-up, while the meshed panels are in a down suspended position, so that the occupants are protected from insects, but remain cooler than in standard golf cart enclosures with only plastic panels. Alternatively, the outer panel may be used as a storage cover for the golf cart, when the cart is stored during off-season.

U.S. Pat. Nos. 5,820,196 and 5,845,958 (Rudys, et al.) disclose a motor vehicle transport cover, which is made of a vapor permeable, water impermeable, synthetic nonwoven sheet. The transport cover includes a mechanism for firmly attaching the nonwoven sheet in a position on a motor vehicle that covers substantially all of the roof, hood, and front bumper fascia of the vehicle and remains attached at air speeds along the major axis of the vehicle of at least 50 mph. The attachment mechanism is releasable, and it leaves substantially no visible adhesive residue on the vehicle at the moment the nonwoven sheet is removed from the vehicle. In U.S. Pat. No. 5,820,196, the transport cover does not significantly inhibit access to the covered vehicle, and it does not obstruct the view of a driver of the covered vehicle. The transport cover has a front sheet piece made to cover the hood of the covered vehicle and a top sheet piece made to cover the roof of the covered vehicle. Where the covered vehicle is a sedan, the transport cover may also cover the trunk and rear bumper of the vehicle. In U.S. Pat. No. 5,845,958, the transport cover may be a unitary cover that covers substantially all of the finished surfaces of a covered vehicle. The transport cover does not prevent driver access to a covered vehicle, and it does not unduly obstruct the view of a driver of the covered vehicle.

U.S. Pat. No. 6,340,198 (Benites, et al.) discloses a multi-part and multi-function cover for selective portions of a vehicle. The cover includes a cover member that covers the selective portions of the vehicle, fastening apparatus that is associated with the cover member and fastens the cover member on the selective portions of the vehicle, and a bag that stores the cover member when not in use. The cover member includes a lower portion that covers the pair of front fenders of the vehicle, the hood of the vehicle, the at least one door of the vehicle, the pair of rear quarter panels of the vehicle, and the trunk lid of the vehicle. The cover member also includes an upper portion that is independent from the lower portion of the cover member, and covers the roof of the vehicle, the front windshield of the vehicle, the rear windshield of the vehicle and the at least one side window of the vehicle. When the vehicle is a convertible and the roof of the vehicle is down, the upper portion of the cover member also functions as a tonneau cover that protects the interior of the vehicle.

U.S. Pat. No. 6,273,493 (Woo) discloses a vehicle cover system, comprising a hood cover segment for covering the hood of a vehicle; a roof cover segment for covering the roof of the vehicle; and a trunk cover segment for covering the trunk door of the vehicle. By deploying and installing the cover segments on the hood, roof, and trunk door of the vehicle respectively, the mounting operation of the vehicle cover system as a whole is completed and it is possible to protect the vehicle body and paint finish thereon.

U.S. Pat. No. 6,220,648 (Daniel) discloses a hail protective shield, which consists of a laminated design, having multiple layers of resilient shock-absorbing material for padding, strength and shape. An outer layer of high density polyethylene ("HDPE") mesh is layered with closed cell foam to produce a 2-ply covering material. In a preferred embodiment, a thin vinyl scrim or polyethylene sheet is layered between the HDPE mesh and the closed cell foam to provide a 3-ply covering material. The shield is constructed of two generally rectangular top panels affixed to each other along their common longest sides, each top panel being flanked by generally trapezoidally-shaped side panels. The seams between the panels are preferably constructed using a sewing technique that produces a reflexive joint between the panels, tending to fold the panels towards each other, and giving the over all hail shield a reflexive tendency to "grip" the car to increase the attachment security of the shield. The outer edges of the panels are bordered by sleeves through which elastic shock cords pass. Hooks affixed to the ends of the shock cords provide means for attachment to the car's exterior at points such as holes in wheels or wheel covers. The design of the car shield allows for substantially compact folding and rolling of the shield for relatively convenient storage in a duffle-type bag in the car trunk, when not in use.

U.S. Pat. No. 6,099,067 (Butterworth) discloses a vehicle transport cover that protectively overlays the painted exterior surfaces of a vehicle. The cover includes a base sheet made of a moisture-resistant material that overlays the vehicle. An elastic strip that circumferentially extends along the vehicle encircling the bottom edge of the base sheet holds the vehicle cover in place and ensures a substantially tight fit over the vehicle. Openings provided in the base sheet and which overlay all the vehicle windows are covered by transparent window sheets that promote driver visibility. A zippered slit is also provided in the cover along the base sheet region, which is aligned over the driver-side door to allow easy access to and from the driver seat when the cover is arranged over the vehicle.

U.S. Pat. No. 4,179,152 (Kent, Jr.) discloses a method and apparatus for securing fabric tops to a vehicle. The method and apparatus includes wind-proofing during inclement weather the connecting edges of a fabric top deployed on four-wheeled vehicles, wherein the fabric top is conventionally secured to the frame of the vehicle by way of various fasteners, the interspaces between such fasteners being further secured by pile strips mounted on semi-rigid material adhesively attached to the vehicle. The corresponding segments of the fabric top are similarly provided with overlying loop strips sewn to the fabric, the loop engaging the pile in a manner similar to that achieved by the material structure commonly sold under the mark "VELCRO." It is intended to dispose such attachment strips at the wind-receiving locations in the vehicle, such as for example, at the leading edge of the door and at the attachment edges of the top.

U.S. Pat. No. 5,388,702 (Jones) discloses a pallet jacket, which is adapted to fit over and secure cargo to a base, such as an aircraft cargo pallet. The pallet jacket includes a cover having a central section and extending side flaps. The vertical lengths of the side flaps are preferably controllably adjustable. Separate securing straps are used to secure the cover over cargo and to a base. The securing straps are held proximate and in a sliding relation to the cover by strap keepers and lateral tension straps. The lateral tension straps are releasably connectable to form one or more continuous bands around portions of the cargo. In preferred embodiments, the cover includes a windowed receptacle for retention and display of items upon the outside of the cover.

U.S. Pat. No. 5,738,403 (Tyson) discloses a vehicle protective cover, which includes a plurality of lightweight separable panels, each having an inner layer, a thicker shock absorbing center layer, and a substantially thinner outer layer, which defines a skirt having plural spaced-apart tie-down lines for securing the cover on the vehicle with the skirt disposed extending from the vehicle in a tensioned, stand-off position.

U.S. Pat. No. 6,588,827 (Heiland) discloses a protective cover for motor vehicles, machines, or the like, for surface protection against abrasive or chemical emissions, and moisture, caused by condensation, water logging and penetrating moisture, and against mechanical damage, during parking, storage and transportation. Partial covers for surfaces needed for visibility and partial covers for doors, which can be opened and closed, are also disclosed. The covers can be anchored at the underbody of the vehicles and/or snapped in at various locations.

U.S. Pat. No. 4,289,346 (Bourgeois) discloses a collapsible and extendable protective cover mechanism for storage areas, which includes a pair of elongated guide tracks positioned in parallel relation on either side of the area to be protected. A plurality of cover segments, each having side portions interconnected by a top portion are positioned with the lower extremities of the side portions in guided engagement with the elongated track means. A power actuator system is interconnected with at least one of the cover segments, and, when energized, causes simultaneous movement of the side portions of at least one of the segments, causing the protective cover mechanism to move toward a collapsed position, where a majority of the area is exposed or an extended position where substantially all of the area is covered and protected. A single drive motor of the power actuator mechanism functions through a chain drive, to cause simultaneous rotation of threaded members that are secured at either side of the area to be protected. An internally threaded connecting element is received by the rotatable threaded elements, and is movable linearly upon rotation of the threaded elements. Threaded pins establish connection between the lower portions of at least one of the cover segments and the linearly movable connector element, thus resulting in linear movement of the cover segments upon selective energization of the drive motor.

For the foregoing reasons, there is a need for a vehicle cover system, which minimizes the number of covers required to be manufactured and inventoried, and which fits substantially all the recreational vehicles currently in use and projected to be in use for the foreseeable future. The vehicle cover system should have a minimum number of different component parts for simplicity of manufacturing, and to minimize cost and inventory requirements. The vehicle cover system should minimize abrasion and damage to a vehicle that the vehicle cover system is installed on, and minimize wear to the vehicle cover system. The vehicle cover system should be long lasting, durable, easy and simple to install and manufacture, and facilitate easy entry to and exit from the vehicle.

SUMMARY

The present invention is directed to a vehicle cover system, which minimizes the number of covers required to be manufactured and inventoried, and which fits substantially all the recreational vehicles currently in use and projected to be in use for the foreseeable future. The vehicle cover system has a minimum number of different component parts for simplicity of manufacturing, and to minimize cost and inventory requirements. The vehicle cover system minimizes abrasion and damage to a vehicle that the vehicle cover system is installed on, and minimizes wear to the vehicle cover system. The vehicle cover system is long lasting, durable, easy and simple to install and manufacture, and facilitates easy entry to and exit from the vehicle.

A vehicle cover system having features of the present invention comprises: removably attachable mating cover portions adapted to cover a vehicle, the vehicle having a top, a bottom, opposing sides; a front end, and a rear end; each the removably attachable mating cover portion removably attached to and mating with at least one adjacent one of the removably attachable mating cover portions; the removably attachable mating cover portions comprising: at least one substantially U shaped cover portion adapted to cover a portion of the top and an adjacent portion of each of the opposing sides of the vehicle; front and rear end portions adapted to cover the front end and the rear end of the vehicle, respectively; the at least one substantially U shaped cover portion having a length selected from the group consisting of a first length, a second length, and a third length.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–7 of the drawings. Identical elements in the various figures are identified with the same reference numbers.

Figure 1:
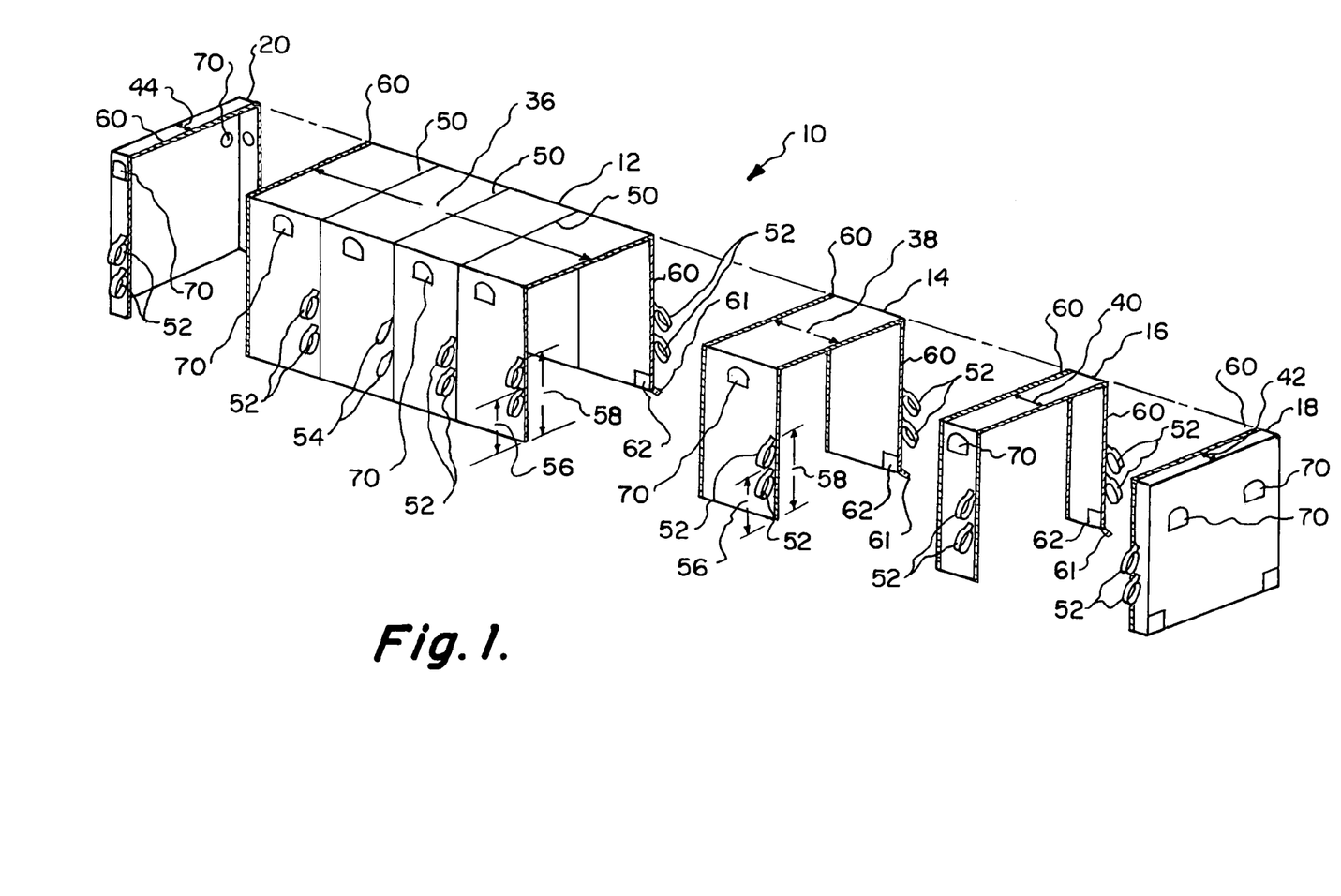
FIG. 1 is an exploded view of a vehicle cover system, constructed in accordance with the present invention.
Figure 2:
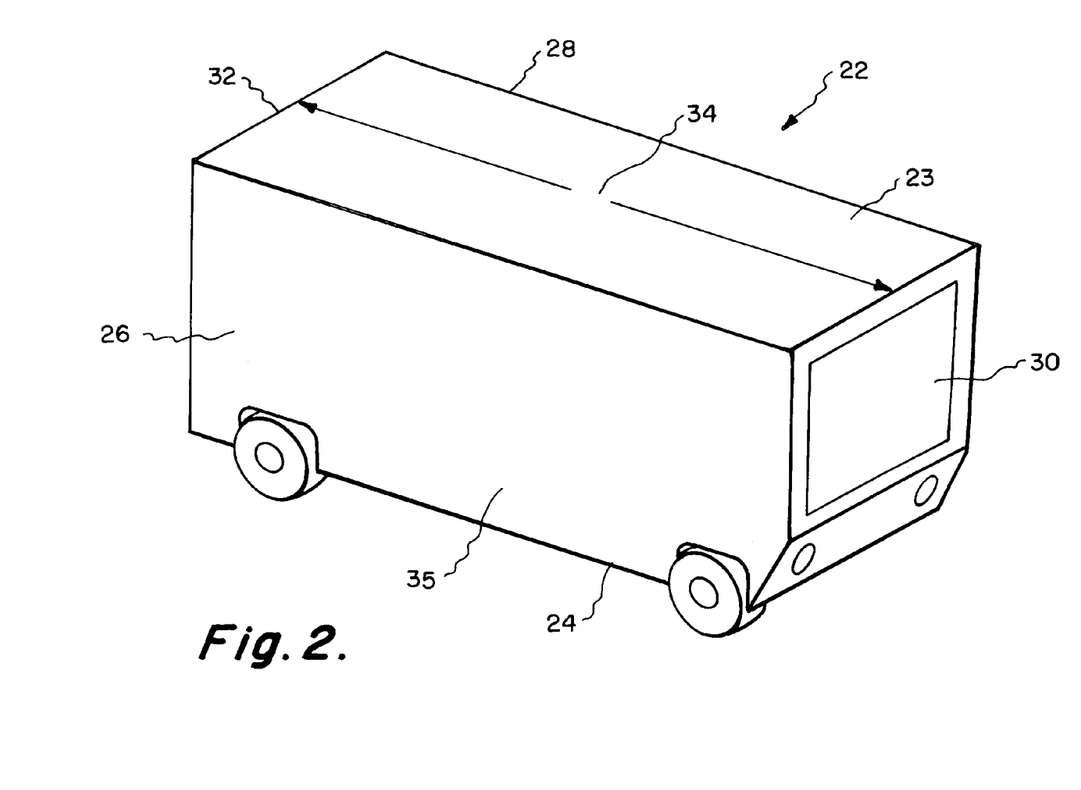
FIG. 2 is a perspective view of a vehicle having an elongated mid section.

FIG. 1 shows an embodiment of the present invention, a vehicle cover system 10 comprising removably attachable mating substantially U shaped cover portions 12, 14, and 16, removably attachable mating front end cover portion 18, and removably attachable mating rear end cover portion 20 adapted to cover a vehicle 22, shown in FIG. 2. The vehicle cover 10 is shown unfolded and erected in the exploded perspective view of FIG. 1.

The vehicle 22 has a top 23, a bottom 24, opposing sides 26 and 28, a front end 30, and a rear end 32. The vehicle cover system 10 may have one or more of the removably attachable mating substantially U shaped cover portions 12 and optionally one or more of either or both of the removably attachable mating substantially U shaped cover portions 14 and 16, depending on length 34 of the vehicle 22. Recreational vehicles, trailers, campers, busses, vans, and the like often have box-like structures, having an elongated mid section 35, the front and rear ends 30 and 32, respectively, the top and the bottom 23 and 24, respectively, as shown in FIG. 2, the front and rear ends 30 and 32, respectively, having exterior shapes which are similar or substantially the same.

The removably attachable mating substantially U shaped cover portions 12, 14, and 16 are adapted to cover portions of the top 23 and adjacent portions of the opposing sides 26 and 28 of the vehicle 22. The removably attachable mating front end cover portion 18 and the removably attachable mating rear end cover portion 20 are adapted to cover the front end 30 and the rear end 32 of the vehicle 22, respectively.

The removably attachable mating front and rear end cover portions 18 and 20, respectively, are matingly removably attached to an adjacent one of the removably attachable mating U shaped cover portions 12, 14, and 16. The removably attachable mating U shaped cover portions 12, 14, and 16 are matingly removably attachable one to the other and to the removably attachable mating front and rear end cover portions 18 and 20, respectively, one to the other. The vehicle cover system 10 may have one or more of the removably attachable mating substantially U shaped cover portions 12 and optionally one or more of either or both of the removably attachable mating substantially U shaped cover portions 14 and 16, depending on length 34 of the vehicle 22, the vehicle cover system 10 fitting a substantially unlimited variety, number and types of the vehicle 22.

The removably attachable mating substantially U shaped cover portions 12, 14, and 16 are substantially the same as one another, except that the removably attachable mating substantially U shaped cover portion 12 has a first length 36, the removably attachable mating substantially U shaped cover portion 14 has a second length 38, and the removably attachable mating substantially U shaped cover portion 16 has a third length 40. The removably attachable mating front end cover portion 18 and the removably attachable mating rear end cover portion 20 have lengths 42 and 44, respectively. The front end and rear end portions 18 and 20, respectively, are preferably substantially the same as one another, but may be different one from the other depending on the shapes of the front and rear ends 30 and 32, respectively, of the vehicle 22. The vehicle 22 has the length 34.

The removably attachable mating U shaped cover portions 12, 14, and 16 for any particular application are selected from an inventory group of the removably attachable mating U shaped cover portions 12, 14, and 16 having the first length 36, the second length 38, and the third length 40, respectively, to fit the vehicle 22 of substantially any length 34.

A combination of the removably attachable mating U shaped cover portions 12, 14, and 16 may be used to cover the vehicle 22 of substantially any length, although certain ones of the removably attachable mating U shaped cover portions 14 and 16 may not be required for a specific vehicle 22, depending on the vehicle's length 34, or more than one of any particular one of the removably attachable mating U shaped cover portions 12, 14, and 16 may be used depending on the length 34 of the vehicle 22.

The vehicle cover system 10 may, thus, be used to cover the vehicle 22 of substantially any length 34, using one or more of the removably attachable mating substantially U shaped cover portions 12 and optionally one or more of either or both of the removably attachable mating substantially U shaped cover portions 14 and 16 to cover the elongated mid section 35 of the vehicle 22, the removably attachable mating U shaped cover portions 14 and 16 being incorporated into the vehicle cover system 10 as required to cover the vehicle 22 of a particular length 34, the vehicle cover system 10 requiring a minimum of different component parts to be manufactured and inventoried to meet substantially all customer needs.

For most manufacturing and inventory applications, the first length 36 is determined by subtracting the lengths 42 and 44 of the removably attachable mating front end and rear end cover portions 18 and 20, respectively, from the length 34 of the vehicle 22 and adding tolerance of fit required for covering the shortest vehicle 22 for which a vehicle cover manufacturer expects to manufacture and inventory the vehicle cover system 10. The second length 38 may be a fraction of the first length 36, and the third length 40 may be a fraction of the second length 38. For most applications, the third length 40 is typically chosen to be one-half the second length 38, although other suitable fractional relationships may be used. The third length 40 may alternatively be a fraction of the first length 36. Other suitable relationships between the first, second, and third lengths 36, 38, and 40, respectively, may be used.

The removably attachable mating substantially U shaped cover portion 16 has the third length 40, which is the shortest length of the first, second, and third lengths 36, 38, and 40, respectively, of the removably attachable mating substantially U shaped cover portions 12, 14, and 16, respectively. For most manufacturing and inventory applications, the third length 40 may be selected as the maximum length that facilitates a reasonable fit between the expected lengths 34 of different ones of the vehicles 22.

For typical practical applications, the second length 38 is typically selected to be four feet, and the third length 40 is typically selected to be two feet. The lengths 42 and 44 of the removably attachable mating front end and rear end cover portions 18 and 20, respectively, are typically selected to be one foot each. For different ones of the vehicles 22 having the length 34 ranging from eighteen feet to thirty six feet, the first length is typically selected to be sixteen feet. Different ones of the vehicles 22 having their lengths 34 ranging from eighteen feet to thirty six feet can then be easily outfitted with: the removably attachable mating front end and rear end cover portions 18 and 20, respectively, having the lengths 42 and 44, respectively, of one foot each; the first length 36 of the removably attachable mating substantially U shaped cover portions 12 of sixteen feet; the second length 38 of the removably attachable mating substantially U shaped cover portions 14 of four feet; and the third length 40 of the removably attachable mating substantially U shaped cover portions 16 of two feet; the removably attachable mating substantially U shaped cover portions 14 and 16 being used as required to make up the difference of lengths 34 between the shortest expected length 34 of eighteen feet and the longest expected length 34 of thirty six feet of the vehicle 22. If the front and rear ends 30 and 32, respectively, of the vehicle 22 have substantially the same shape, then the removably attachable mating front end cover portion 18 and the removably attachable mating rear end cover portion 20 may be substantially the same.

From a manufacturing and inventory perspective, then, most, if not all, of the manufacturing and inventory requirements for the vehicles 22 can be satisfied with just the three lengths of the removably attachable mating substantially U shaped cover portions 12, 14, and 16, i.e., the first, second and third lengths 36, 38, and 40 and just one length of the removably attachable mating front end and rear end cover portions 18 and 20, respectively, i.e., the lengths 42 and 44 being substantially the same, and the removably attachable mating front end and rear end cover portions 18 and 20, respectively, being substantially the same. Thus, only four different covers need be manufactured and inventoried to cover the broad spectrum of the lengths 34 and types of the vehicles 22 on the market and expected to be on the market for the foreseeable future.

Figure 3:
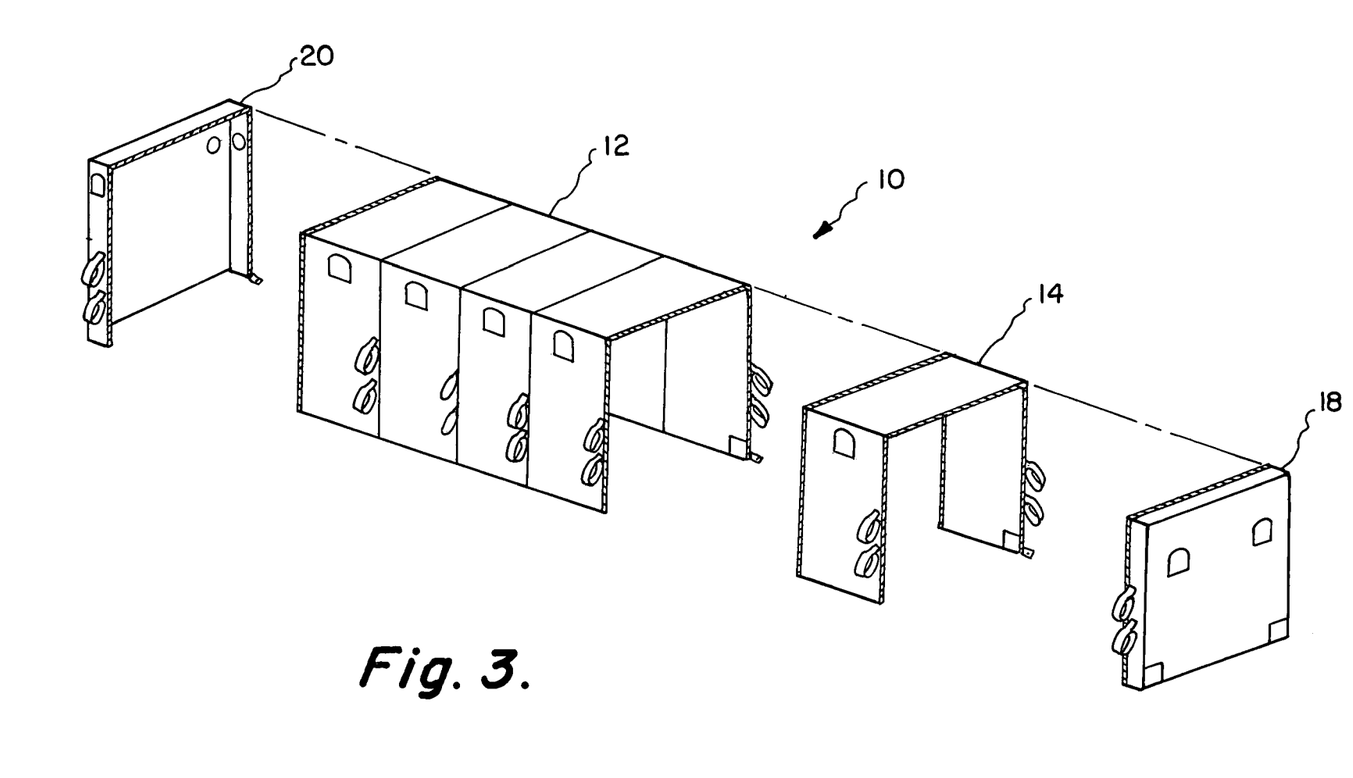
FIG. 3 is an exploded view of the vehicle cover system configured for an alternate vehicle.
Figure 4:
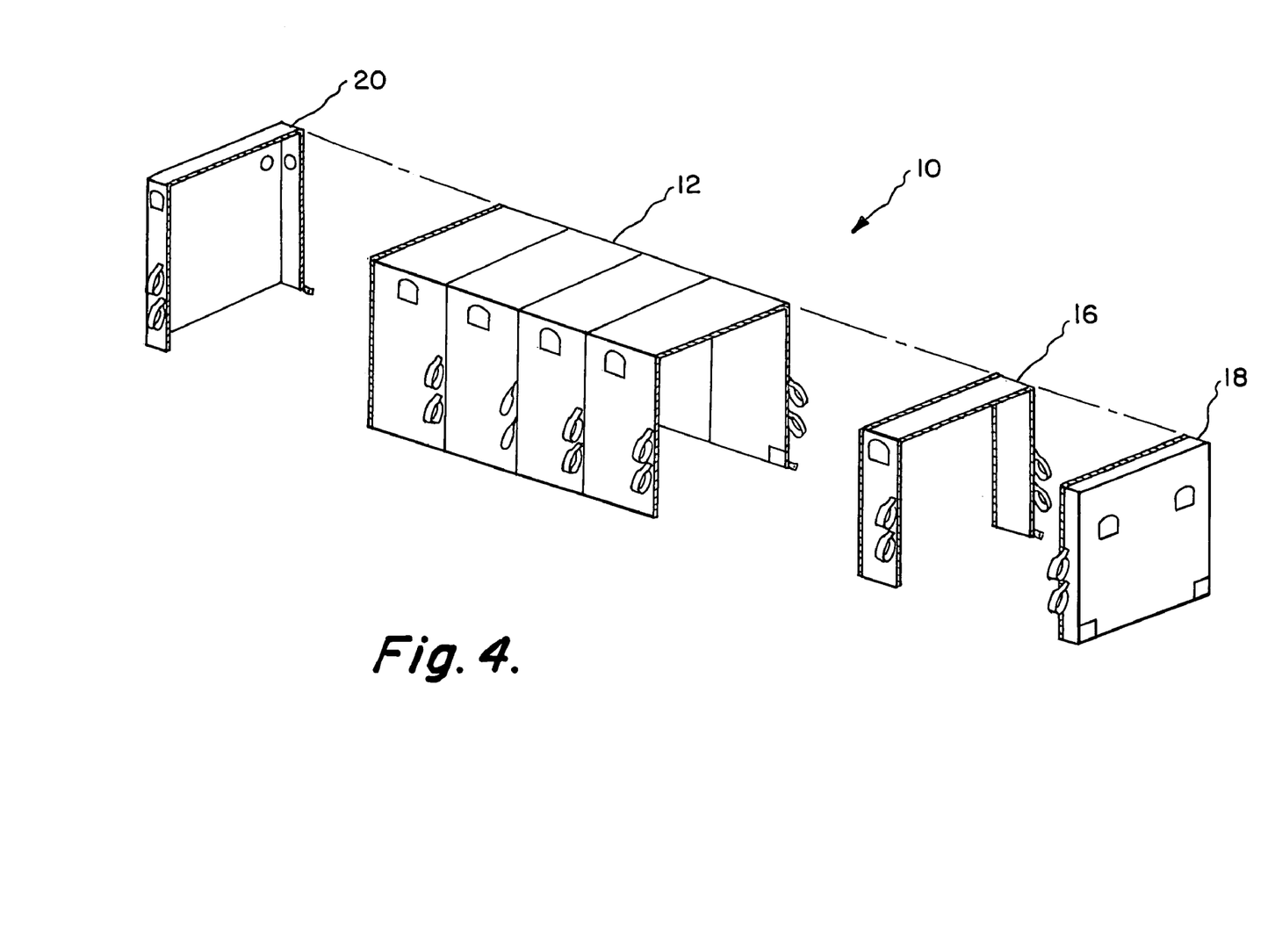
FIG. 4 is an exploded view of the vehicle cover system configured for an alternate vehicle.
Figure 5:
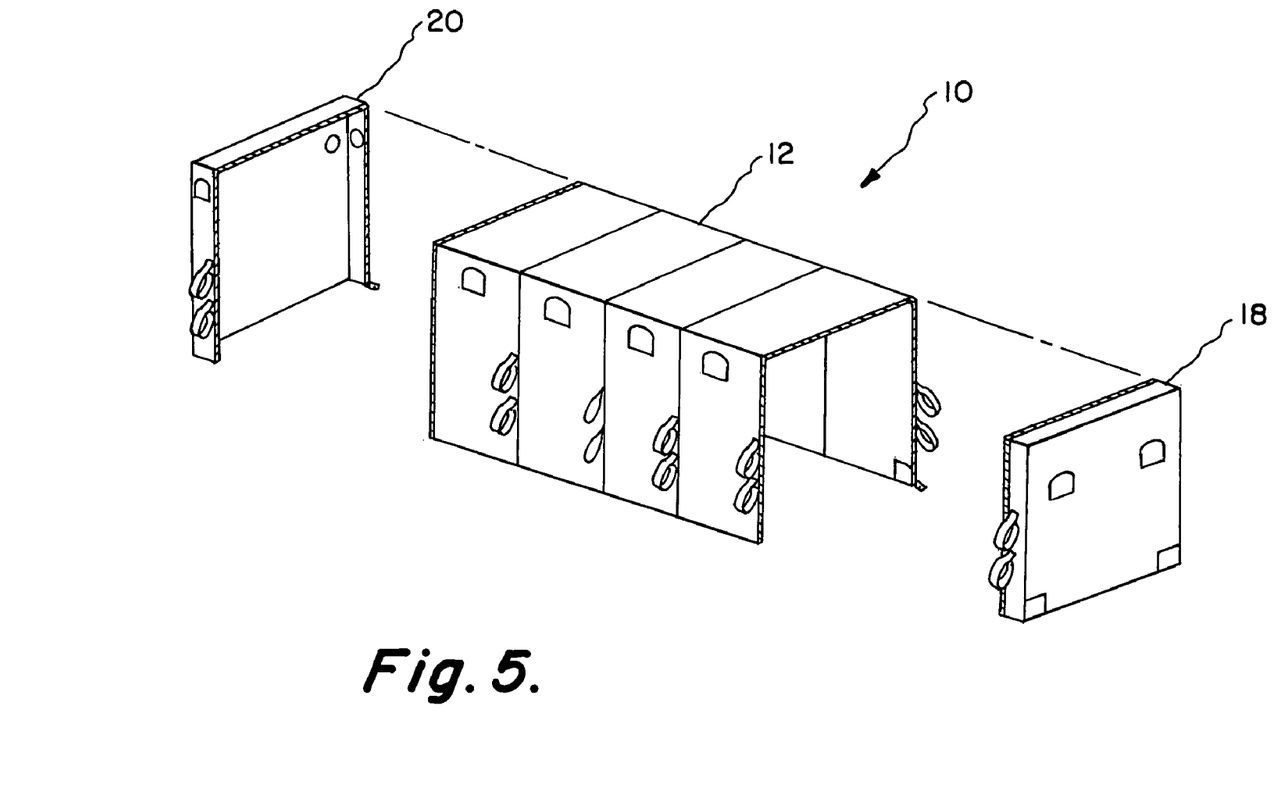
FIG. 5 is an exploded view of the vehicle cover system configured for an alternate vehicle.

FIG. 1 shows the vehicle cover system 10 configured having the removably attachable mating substantially U shaped cover portions 12, 14, and 16 and the removably attachable mating front end and rear end cover portions 18 and 20, respectively. FIGS. 3–5 show the vehicle cover system 10 configured for ones of the vehicle 22 having alternate lengths 34, to illustrate some possible configurations, although other configurations are also possible. FIG. 3 shows the vehicle cover system 10 configured having the removably attachable mating substantially U shaped cover portions 12 and 14 and the removably attachable mating front end and rear end cover portions 18 and 20, respectively. FIG. 4 shows the vehicle cover system 10 configured having the removably attachable mating substantially U shaped cover portions 12 and 16 and the removably attachable mating front end and rear end cover portions 18 and 20, respectively. FIG. 5 shows the vehicle cover system 10 configured having the removably attachable mating substantially U shaped cover portion 12 and the removably attachable mating front end and rear end cover portions 18 and 20, respectively.

The removably attachable mating substantially U shaped cover portions 12, 14, and 16, the removably attachable mating front end cover portion 18, and the removably attachable mating rear end cover portion 20 have seams 50 thereabout, which strengthen and reinforce the removably attachable mating substantially U shaped cover portions 12, 14, and 16 and the removably attachable mating front and rear end cover portions 18 and 20, respectively. A plurality of straps 52 having loops 54 are incorporated into the removably attachable mating substantially U shaped cover portions 12, 14, and 16 and the removably attachable mating front and rear end cover portions 18 and 20, respectively, at different heights 56 and 58 of the seams 50, which facilitate fastening a plurality of elastic cords, or other suitable fastening means, thereto. The straps 52 are fastened to the removably attachable mating substantially U shaped cover portions 12, 14, and 16 and the removably attachable mating front and rear end cover portions 18 and 20, respectively, at the seams 50 to strengthen and reinforce attachment of the straps 52 to the removably attachable mating substantially U shaped cover portions 12, 14, and 16 and the removably attachable mating front and rear end cover portions 18 and 20, respectively, thereto. The elastic cords, or other suitable fastening means, are fastened to each of the straps 52 at the different heights 56 and 58 at the opposing sides 26 and 28 of the vehicle 22 and to hooks or other suitable fasteners at the bottom 24 of the vehicle 22, which hold the vehicle cover system 10 to the vehicle 22, and minimize movement of each of the substantially U shaped cover portions 12, 14, and 16 and the removably attachable mating front and rear end cover portions 18 and 20, respectively, about the vehicle 22, abrasion of the vehicle 22 and wear of the vehicle cover system 10 being minimized.

Each of the removably attachable mating substantially U shaped cover portions 12, 14, and 16, the removably attachable mating front end cover portion 18, and the removably attachable mating rear end cover portion 20 have zippers 60 thereabout, which facilitate fastening and removal of the removably attachable mating substantially U shaped cover portions 12, 14, and 16 and the removably attachable mating front and rear end cover portions 18 and 20, respectively, to and from one another, as required, and/or partial removal of a particular one or ones of the removably attachable mating substantially U shaped cover portions 12, 14, and 16 and the removably attachable mating front and rear end cover portions 18 and 20, respectively, to facilitate entry and/or exit at a door or doors of the vehicle 22.

The zippers 60 having zipper pulls 61 are incorporated about each of the removably attachable mating substantially U shaped cover portions 12, 14, and 16, the removably attachable mating front end cover portion 18, and the removably attachable mating rear end cover portion 20 with the same orientation. The zippers 60 may start, for example, at the left-hand, when viewed toward the front end cover portion 18 of the cover, and zip closed as they travel to the right-hand side of any particular one of the removably attachable mating substantially U shaped cover portions 12, 14, and 16 and the removably attachable mating front and rear end cover portions 18 and 20, respectively, or alternatively zip in the opposite direction; however, all the zippers 60 should zip in the same direction for proper mating of any one of the removably attachable mating substantially U shaped cover portions 12, 14, and 16 and the removably attachable mating front and rear end cover portions 18 and 20, respectively, with the other, as required.

Each of the removably attachable mating substantially U shaped cover portions 12, 14, and 16 and the removably attachable mating front and rear end cover portions 18 and 20, respectively, have color coded tags 62 for identification purposes of each of the components of the vehicle cover system 10 and at locations which identify orientation and alignment required for proper mating of the removably attachable mating substantially U shaped cover portions 12, 14, and 16 and the removably attachable mating front and rear end cover portions 18 and 20, respectively, and the zippers 60, and to aid in manufacturing.

Figure 6:
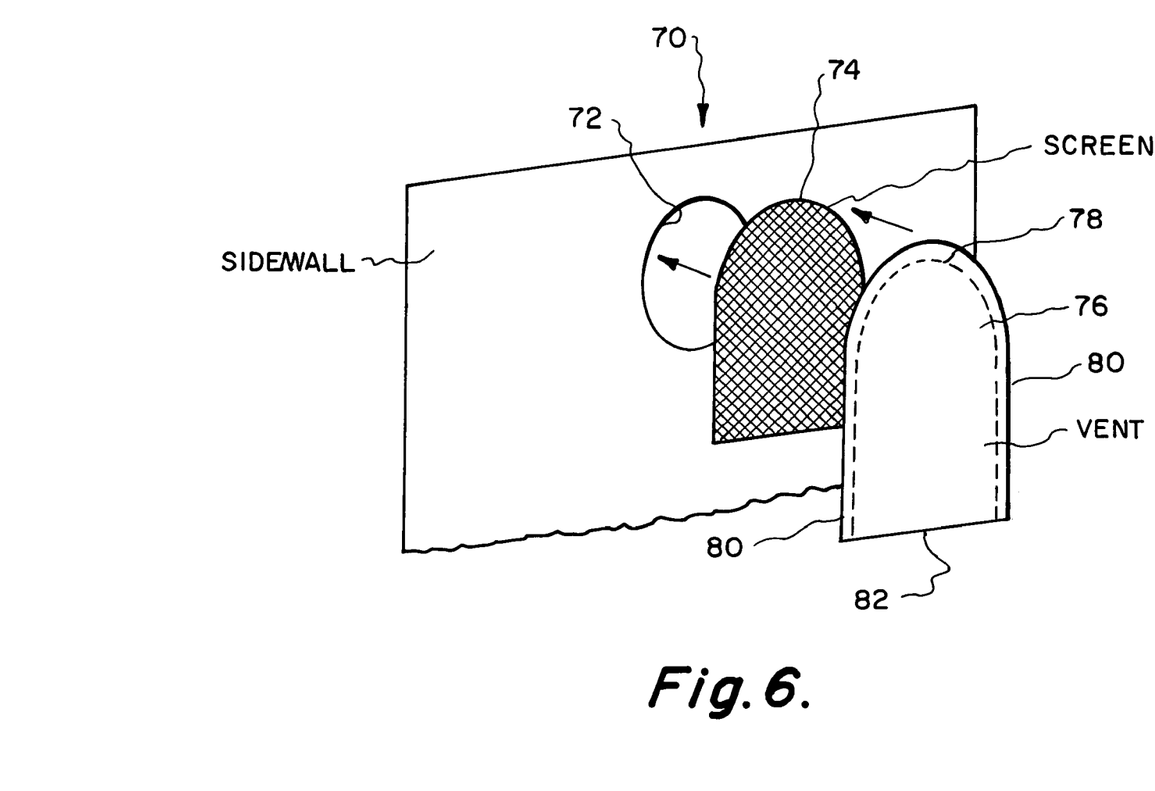
FIG. 6 is a perspective view of a vent of the vehicle cover system.

Each of the removably attachable mating substantially U shaped cover portions 12, 14, and 16 and the removably attachable mating front and rear end cover portions 18 and 20, respectively, have vents 70, shown in FIG. 6, which provide ventilation and minimize moisture buildup between the vehicle cover system 10 and the vehicle 22. The vents 70 comprise holes 72 in the removably attachable mating substantially U shaped cover portions 12, 14, and 16 and the removably attachable mating front and rear end cover portions 18 and 20, respectively, covered by screening 74, which is covered by vent cover 76, the vent cover 76 having top 78 and sides 80 of the vent 70 fastened to the removably attachable mating substantially U shaped cover portions 12, 14, and 16 and the removably attachable mating front and rear end cover portions 18 and 20, respectively, with bottom 82 of the vent 70 remaining open.

The vehicle cover system 10 may be of flexible, water resistant, and ultraviolet resistant material, or other suitable material or combination thereof.

Figure 7:
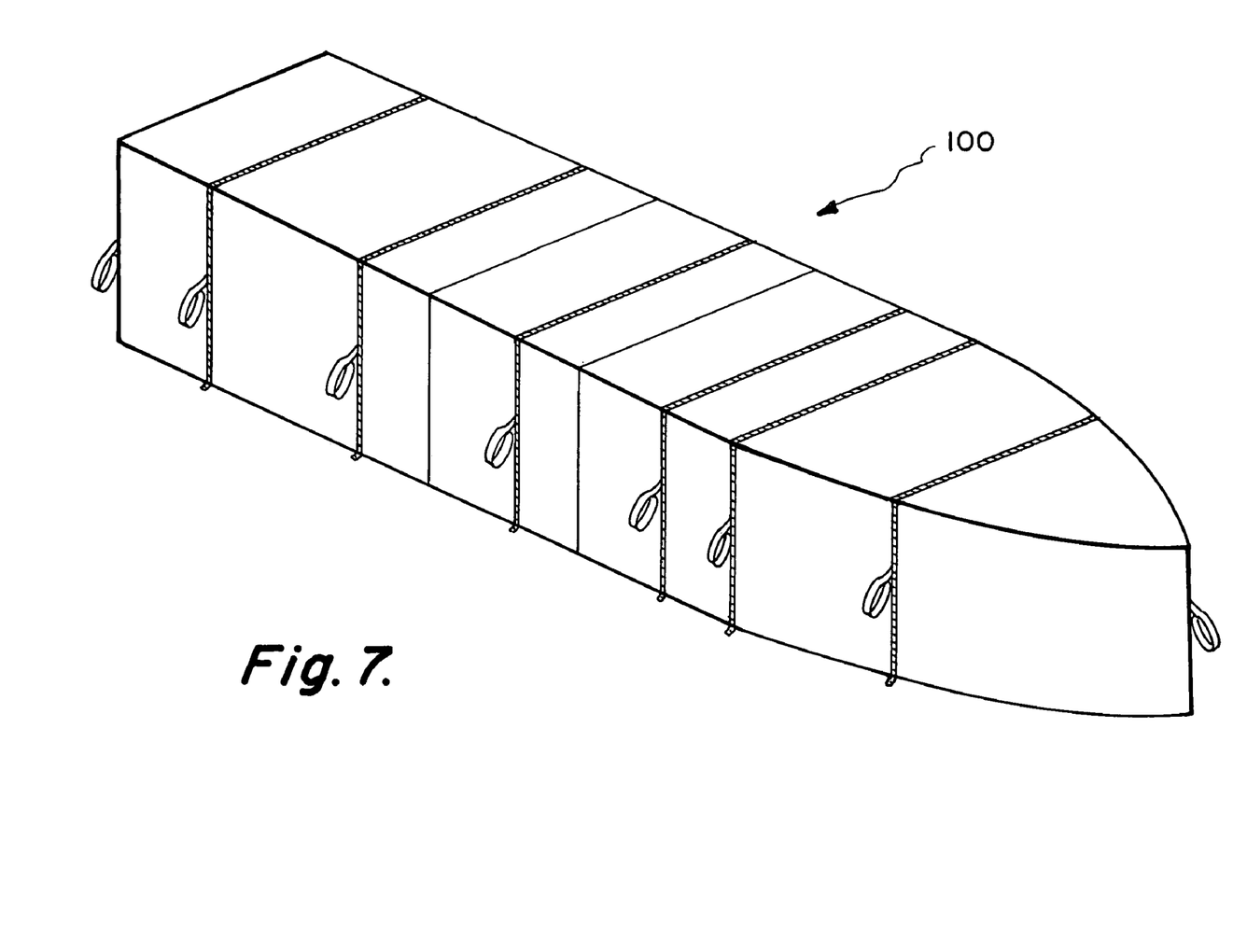
FIG. 7 is a perspective view of an alternate embodiment of a vehicle cover system for an alternate vehicle.

FIG. 7 shows an alternate embodiment of a vehicle cover system 100, which is substantially the same as the vehicle cover system 10, except that the vehicle cover system 100 is for a boat having an elongated mid section.

Although the present invention has been described in considerable detail with reference to certain preferred versions thereof, other versions are possible. Therefore, the spirit and scope of the appended claims should not be limited to the description of the preferred versions contained herein.

What is claimed is:

1. A vehicle cover system, comprising:
   removably attachable mating over portions adapted to cover a vehicle, said vehicle having a top, a bottom, opposing sides, a front end, and a rear end; each said removably attachable mating cover portion removably attached to and mating with at least one adjacent one of said removably attachable mating cover portions;
   said removably attachable mating cover portions comprising:
      at least one substantially U shaped cover portion adapted to cover a portion of said top and an adjacent portion of each of said opposing sides of said vehicle;
      front and rear end portions adapted to cover said front end and said rear end of said vehicle, respectively;
   said front and rear end portions each removably attached to said at least one substantially U shaped cover portion;
   said at least one substantially U shaped cover portion having a length selected from the group consisting of a first length, a second length, and a third length.

2. The vehicle cover system according to claim 1, wherein:
   said at least one substantially U shaped cover portion comprises at least one substantially U shaped cover portion having said first length.

3. The vehicle cover system according to claim 1, wherein:
   said at least one substantially U shaped cover portion comprises at least two substantially U shaped cover portions, each having said first length.

4. The vehicle cover system according to claim 2, wherein:
   said at least one substantially U shaped cover portion further comprises at least one substantially U shaped cover portion having said second length.

5. The vehicle cover system according to claim 3, wherein:
   said at least one substantially U shaped cover portion further comprises at least one substantially U shaped cover portion having said second length.

6. The vehicle cover system according to claim 2, wherein:
   said at least one substantially U shaped cover portion further comprises at least two substantially U shaped cover portions, each having said second length.

7. The vehicle cover system according to claim 3, wherein:
   said at least one substantially U shaped cover portion further comprises at least two substantially U shaped cover portions, each having said second length.

8. The vehicle cover system according to claim 4, wherein:
   said at least one substantially U shaped cover portion further comprises at least one substantially U shaped cover portion having said third length.

9. The vehicle cover system according to claim 5, wherein:
   said at least one substantially U shaped cover portion further comprises at least one substantially U shaped cover portion having said third length.

10. The vehicle cover system according to claim 6, wherein:
    said at least one substantially U shaped cover portion further comprises at least one substantially U shaped cover portion having said third length.

11. The vehicle cover system according to claim 7, wherein:
    said at least one substantially U shaped cover portion further comprises at least one substantially U shaped cover portion having said third length.

12. The vehicle cover system according to claim 4, wherein:
    said at least one substantially U shaped cover portion further comprises at least two substantially U shaped cover portions, each having said third length.

13. The vehicle cover system according to claim 5, wherein:
    said at least one substantially U shaped cover portion further comprises at least two substantially U shaped cover portions, each having said third length.

14. The vehicle cover system according to claim 6, wherein:
    said at least one substantially U shaped cover portion further comprises at least two substantially U shaped cover portions, each having said third length.

15. The vehicle cover system according to claim 7, wherein:
said at least one substantially U shaped cover portion further comprises at least two substantially U shaped cover portions, each having said third length.

16. The vehicle cover system according to claim 1, wherein:
said first length comprises a base length;
said second length comprises a fractional length of said base length;
said third length comprises a fractional length of said second length.

17. The vehicle cover system according to claim 1, wherein:
said first length comprises a base length;
said second length comprises a fractional length of said base length;
said third length comprises another fractional length of said base length.

18. The vehicle cover system according to claim 1, wherein:
said third length is one-half of said second length.

19. The vehicle cover system according to claim 1, wherein:
said vehicle has a lateral length;
said first, second, and third lengths are lateral lengths.

20. The vehicle cover system according to claim 1, wherein:
said front and rear end portions are substantially the same as one another.

21. The vehicle cover system according to claim 1, wherein:
said front and rear end portions each have a length which is substantially the same.

22. The vehicle cover system according to claim 1, wherein:
said front and rear end portions are different one from the other.

23. The vehicle cover system according to claim 1, wherein:
said front and rear end portions each have a shape which is different one from the other
said front and rear end portions each have a length which is substantially the same.

24. The vehicle cover system according to claim 1, wherein said vehicle cover system covers said vehicle.

25. The vehicle cover system according to claim 1, wherein said vehicle has an elongated mid section.

26. The vehicle cover system according to claim 1, wherein said vehicle is from the group consisting of: recreational vehicles, campers, trailers, trucks, vans, automobiles, boats, and airplanes.

27. The vehicle cover system according to claim 1, wherein each of said removably attachable mating cover portions have seams.

28. The vehicle cover system according to claim 27, wherein said seams are reinforcing seams.

29. The vehicle cover system according to claim 1, wherein:
each of said removably attachable mating cover portions has opposing sides and a plurality of straps fastened to each of said cover portion opposing sides.

30. The vehicle cover system according to claim 29, wherein:
each of said straps has a loop.

31. The vehicle cover system according to claim 29, wherein:
each of said straps is adapted to attach a fastener thereto, which extends to and is fastened to said bottom of said vehicle.

32. The vehicle cover system according to claim 1, wherein said removably attachable mating cover portions have zippers.

33. The vehicle cover system according to claim 32, wherein said removably attachable mating cover portions have edges and said zippers are fastened to said removably attachable mating cover portions at said edges.

34. The vehicle cover system according to claim 32, wherein each of said zippers are fastened to said removably attachable mating cover portions, in accordance with the same orientation.

35. The vehicle cover system according to claim 32, wherein each of said zippers are fastened to said removably attachable mating cover portions to fasten substantially clockwise facing said front of said vehicle.

36. The vehicle cover system according to claim 32, wherein each of said zippers are fastened to said removably attachable mating cover portions to fasten substantially counterclockwise facing said front of said vehicle.

37. The vehicle cover system according to claim 1, wherein each of said removably attachable mating cover portions have identifying indicia.

38. The vehicle cover system according to claim 1, wherein each of said removably attachable mating cover portions are color coded.

39. The vehicle cover system according to claim 1, wherein each of said removably attachable mating cover portions have color coded identifying tags.

40. The vehicle cover system according to claim 1, wherein each of said removably attachable mating cover portions have at least one vent.

41. The vehicle cover system according to claim 1, wherein each of said removably attachable mating cover portions have at least one hole adapted to vent each of said removably attachable mating cover portions.

42. The vehicle cover system according to claim 40, wherein each of said vents has a screen.

43. The vehicle cover system according to claim 41, wherein each of said vents has a top, opposing sides, a bottom, and a cover fastened to said top and said opposing sides of said vent.

44. The vehicle cover system according to claim 1, wherein said vehicle cover system is of flexible, water resistant, and ultraviolet resistant material.

\* \* \* \* \*